(12) United States Patent
Takashina et al.

(10) Patent No.: US 7,009,693 B2
(45) Date of Patent: Mar. 7, 2006

(54) GAIN PROFILE MEASURING METHOD AND SYSTEM AND GAIN PROFILE CONTROLLING METHOD AND SYSTEM

(75) Inventors: Kiyoaki Takashina, Tokyo (JP); Toshio Kawazawa, Tokyo (JP); Koji Goto, Tokyo (JP)

(73) Assignees: KDDI Submarine Cable Systems Inc., Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 258 days.

(21) Appl. No.: 10/455,869

(22) Filed: Jun. 6, 2003

(65) Prior Publication Data
US 2003/0231888 A1 Dec. 18, 2003

(30) Foreign Application Priority Data
Jun. 13, 2002 (JP) .............................. 2002-173293

(51) Int. Cl.
*G01N 21/00* (2006.01)
(52) U.S. Cl. .................................................. 356/73.1
(58) Field of Classification Search .............. 356/73.1; 385/12–14, 27–31; 250/227.11, 227.18; 398/9–38
See application file for complete search history.

(56) References Cited

U.S. PATENT DOCUMENTS 6,414,775 B1 * 7/2002 Pedersen .................... 398/177

6,864,968 B1 * 3/2005 Mori et al. ................ 356/73.1

OTHER PUBLICATIONS

Kawazawa, et al., "Novel Gain Tilt Monitoring Method for DWDM Submarine Cable Systems", OAA 2001, OMD3-1—OMD3-3.
Naito, et al., "Active Gain Slope Compensating in Large-Capacity, Long-Haul WDM Transmission System", OAA'99, WC5, pp. 36-39.
Takeda, et al., "Active gain equalization for transoceanic WDM transmission systems", OFC99, WM43-1, pp. 322-324.

* cited by examiner

*Primary Examiner*—Tu T. Nguyen

(74) *Attorney, Agent, or Firm*—Christie, Parker & Hale, LLP

(57) ABSTRACT

To control a gain profile in an optical fiber line to become a desirable form, a C-OTDR measuring apparatus (36) outputs a probe pulse light having a wavelength λm for an optical fiber line (14). A power level on the input or output side of a variable gain equalizer (22) can be measured according to a C-OTDR waveform of a return light of the probe pulse light entered through a C-OTDR path (20c) and an optical fiber line (16). By sweeping the measurement wavelength λm, the gain file is measured. The equalizing characteristics of the variable gain equalizer (22) are remotely controlled so that the gain profile becomes a desirable form according to the measured result.

25 Claims, 9 Drawing Sheets

US 7,009,693 B2

GAIN PROFILE MEASURING METHOD AND SYSTEM AND GAIN PROFILE CONTROLLING METHOD AND SYSTEM

CROSS REFERENCE TO RELATED APPLICATIONS

This application claims priority to Japanese Patent Application No. 2002-173293, filed Jun. 13, 2002, the entire contents of which are incorporated herein by reference.

FIELD OF THE INVENTION

This invention generally relates to a gain profile measuring method and system and a gain profile controlling method and system, and more specifically relates to a method and system for measuring a gain profile in the middle of an optical transmission line and a gain profile controlling method and system for controlling a gain profile in an optical transmission line by utilizing the gain profile measuring method and system.

BACKGROUND OF THE INVENTION

As a premise to control a gain profile in an optical transmission line, it is necessary to know the gain profile as a function of a wavelength. For such purpose, one of two well-known methods is to measure a gain slope using pre-emphasis and the other is to measure a gain slop using an optical filter in a repeater.

The former method is described, for instance, in T. Kawazawa et al., "Novel Gain Tilt Monitoring Method for DWDM Submarine Cable Systems", OAA 2001, OMD3. In this method, a variable gain equalizer and a photodetector, which measures an optical power after gain equalization, are disposed in an optical repeater. A transmission terminal apparatus increases optical powers of several wavelengths on a short wavelength side (or a long wavelength side) to compare optical power variations of signal lights gain-equalized by the variable gain equalizer in the optical repeater before and after increasing optical power. A gain slope is measured according to the compared results.

The latter method is, for instance, described T. Naito et al., "Active Gain Slope Compensation in Large Capacity, Long-Haul WDM Transmission System", OAA99, WC5. In this method, an optical repeater comprises a first optical filter to extract wavelength on long wavelength side, a second optical filter to extract wavelength on short wavelength side, a first photodetector to measure an output optical power from the first optical filter, a second photodetector to measure an output optical power from the second optical filter, and a comparator to compare the outputs from the first and second photodetectors. It is determined whether a gain slope is positive or negative by comparing the optical powers of both wavelengths. Even this method cannot measure the gain profile itself.

Although the prior art are capable of measuring whether a gain slope is positive or negative, neither of them can measure a gain profile itself. In the latter method, furthermore, it is required to dispose two optical filters in the optical repeater.

In the latter method, although a gain profile can be measured if a plurality of optical filters or wavelength demultiplexer are disposed, it is required to dispose photodetectors equal to the number of wavelengths to be measured. It is difficult to dispose so many optical elements and circuit elements in an optical repeater.

SUMMARY OF THE INVENTION

A gain profile measuring method according to the invention is a method, in an optical transmission system having first and second optical fiber lines, each transmits a signal light in the opposite direction from the other, and an optical loop back circuit to optically connect between the first and second optical fiber lines, to measure a gain profile in the first optical fiber line, the method comprising step of supplying a plurality of laser lights, each having a different wavelength ($\lambda 1$ to $\lambda n$), and a probe pulse light having a measurement wavelength ($\lambda m$) different from the wavelengths of the plurality of laser lights into the first optical fiber line, step of measuring a power level of the probe pulse light on a predetermined position in the first optical fiber line from a return light of the probe pulse light entered through the optical loop back circuit and second optical fiber line, and step of performing the supplying and measuring steps while varying the measurement wavelength within the predetermined wavelength range.

A gain profile measuring system according to the invention is a system, in an optical transmission system having first and second optical fiber lines, each transmits a signal light in the opposite direction from the other, and an optical loop back circuit to optically connect between the first and second optical fiber lines, to measure a gain profile in the first optical fiber line, the system comprising laser light generators to generate a plurality of laser lights, each having a different wavelength ($\lambda 1$ to $\lambda n$), a probe pulse light generator to generate a probe pulse light having a measurement wavelength ($\lambda m$) variable within a predetermined wavelength range, an optical coupler to combine the laser lights output from the laser light generators and the probe pulse light and to output the combined light for the first optical fiber line, a measuring apparatus to measure a power level of the probe pulse light on a predetermined position in the first optical fiber line from a return light of the probe pulse light entered through the optical loop back circuit and second optical fiber line, and a controller to control the measuring apparatus so as to perform measurement within the predetermined wavelength range while varying the measurement wavelength within the predetermined wavelength range.

The above configuration makes it possible to measure a power level of each swept measurement wavelength on the predetermined position in the first optical fiber line. The measured result shows a gain profile in the first optical fiber line on the predetermined position.

A gain profile controlling method according to the invention is a method, in an optical transmission system having first and second optical fiber lines, each transmits a signal light in the opposite direction from the other, and an optical loop back circuit to optically connect between the first and second optical fiber lines, to control a gain profile in the first optical fiber line, the method comprising step of supplying a plurality of laser lights, each having a different wavelength ($\lambda 1$ to $\lambda n$), and a probe pulse light having a measurement wavelength ($\lambda m$) different from the wavelengths of the plurality of laser lights to the first optical fiber line, step of measuring a power level of the probe pulse light on a predetermined position in the first optical fiber line from a return light of the probe pulse light entered through the optical loop back circuit and second optical fiber, step of storing a measured result of the measuring step after operating the probe pulse supplying step and measuring step within the predetermined wavelength range while varying the measurement wavelength within the predetermined wavelength range, and step of controlling equalizing characteristics of a variable gain equalizer disposed in the first optical fiber line according to the measured result stored in the measured result storing step.

A gain profile controlling system according to the invention is a system, in an optical transmission system having first and second optical fiber lines, each transmits a signal light in the opposite direction from the other, and an optical loop back circuit to connect between the first and second optical fiber lines, to control a gain profile in the first optical fiber transmission line, the system comprising a variable gain equalizer disposed in the first optical fiber line, laser light generators to generate a plurality of laser lights, each having a different wavelength ($\lambda 1$ to $\lambda n$), a probe pulse light generator to generate a probe pulse light having a measurement wavelength ($\lambda m$) variable within a predetermined wavelength range, an optical coupler to combine the laser lights from the laser light generators and the probe pulse light and to output the combined light to the first optical fiber line, a measuring apparatus to measure a power level of the probe pulse light on a predetermined position in the first optical fiber line from a return light of the probe pulse light entered through the optical loop back circuit and second optical fiber line, and a controller to control the measuring apparatus so as to perform measurement within the predetermined wavelength range while varying the measurement wavelength within the predetermined wavelength range and to control the variable gain equalizer according to the power levels of the plurality of measurement wavelengths measured on the predetermined position.

The above configuration makes it possible to measure a power level of each swept measurement wavelength on the predetermined wavelength position in the first optical fiber line. Since the measured results shows the gain profiles on the predetermined position in the first optical fiber line, it is possible to obtain a desirable gain profile in the first optical fiber line by controlling the equalizing characteristics of the variable gain equalizer according to the measured results.

BRIEF DESCRIPTION OF THE DRAWINGS

The above and other objects, features and advantages of the present invention will be apparent from the following detailed description of embodiments of the invention in conjunction with the accompanying drawings, in which.

DETAILED DESCRIPTION

Embodiments of the invention are explained below in detail with reference to the drawings.

Figure 1:
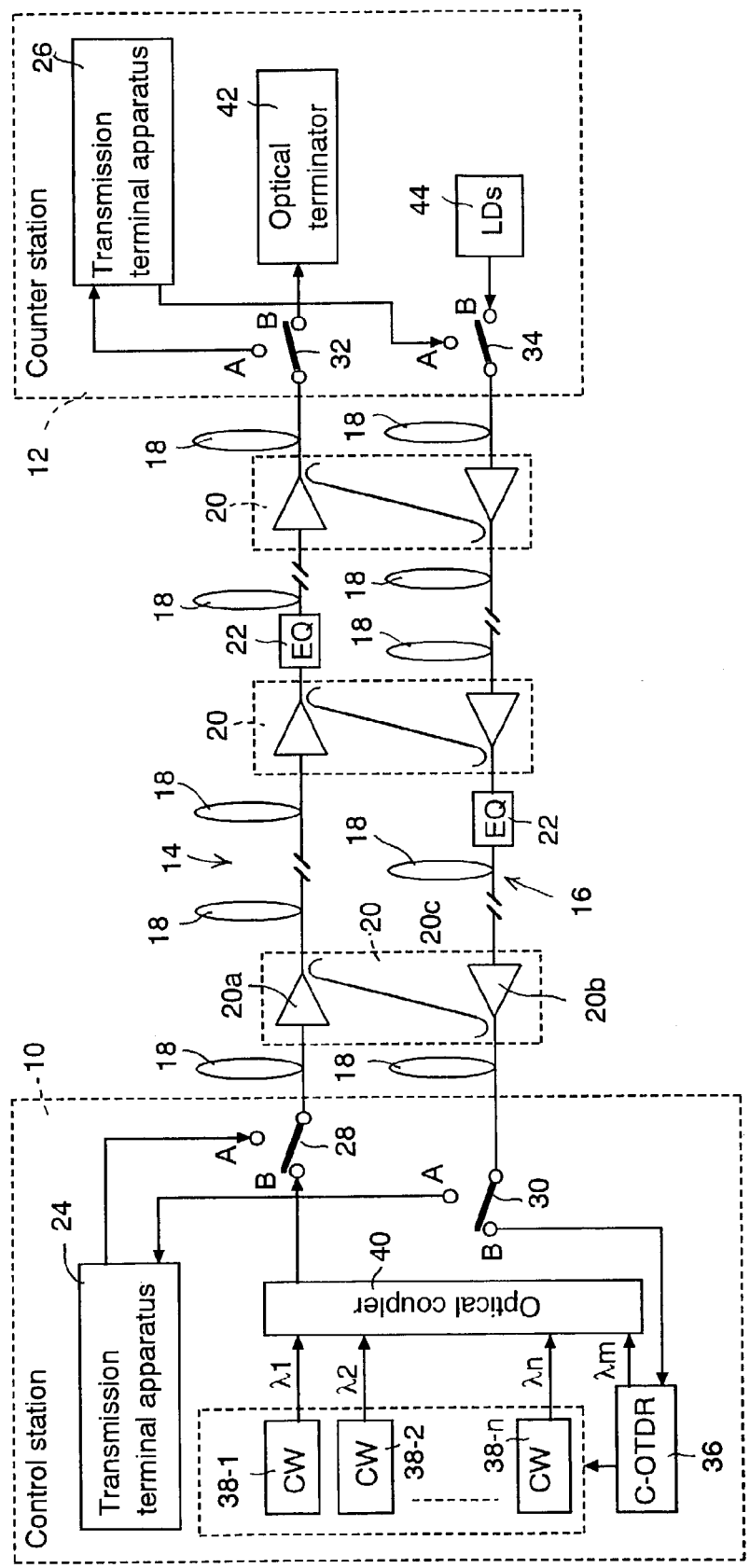
FIG. 1 shows a schematic block diagram of a first embodiment according to the invention.

FIG. 1 shows a schematic block diagram of a first embodiment according to the invention. Two optical fiber lines 14 and 16 connect between a control station 10 and a counter station 12. Each of the optical fiber lines 14 and 16 comprises a plurality of optical transmission fibers 18 and optical repeaters 20 for optically amplifying optical signals propagating in the optical transmission fibers 18. In the embodiment, each of the optical fiber lines 14 and 16 further comprises at least one variable gain equalizer 22 disposed on an appropriate position in the fiber line.

Each of the optical repeaters 20 comprises an optical amplifier 20a in the optical fiber line 14, an optical amplifier 20b in the optical fiber line 16, and a C-OTDR (Coherent Optical Time Domain Reflectometry) path 20c or optical loop back circuit for looping back a light between the optical fiber lines 14 and 16.

Although the details are described later, in the embodiment, a gain profile in the optical fiber line 14 is measured using C-OTDR and a variable gain equalizer 22 is remotely controlled to form the gain profile in a desirable shape. In FIG. 1, to make it easily understandable, only the configuration to measure and control a gain profile in the optical fiber line 14 is shown. However, it is obvious that a gain profile in the optical fiber line 16 can be measured by replacing the configuration of the control station 10 and the configuration of the counter station 12, and also the gain profile in the optical fiber line 16 is controlled by the variable gain equalizer 22 in the optical fiber line 16.

For the transmission of optical signals through the optical fiber lines 14 and 16, the control station 10 comprises a transmission terminal apparatus 24 and the counter station 12 comprises a transmission terminal apparatus 26. Furthermore, it is assumed that a WDM transmission system of n wavelengths ($\lambda 1$ to $\lambda n$) is used for the signal transmission between the transmission terminal apparatuses 24 and 26, and thus the optical fiber lines 14 and 16 are designed accordingly.

In the embodiment shown in FIG. 1, neither to operate the signal transmission between the transmission terminal apparatuses 24 and 26 nor the measuring and controlling of the gain profile in the optical fiber line 14 at the same time is possible. For the changeover, optical switches 28 and 30 are disposed in the control station 10, and optical switches 32 and 34 are disposed in the counter station 12.

For the measuring and controlling of the gain profile in the optical fiber line 14, the control station 10 further comprises a C-OTDR measuring apparatus 36, laser diodes (LD) 38-1 to 38-n which continuously laser-oscillate at wavelengths $\lambda 1$ to $\lambda n$ respectively, and an optical coupler 40 which couples output lights from the LDs 38-1 to 38-n and a measurement light of wavelength $\lambda m$ output from the C-OTDR measuring apparatus 36 for measuring the gain profile in the optical fiber line 14. The C-OTDR measuring apparatus 36 can sweep the measurement wavelength $\lambda m$ continuously or discretely within the wavelengths $\lambda 1$ to $\lambda n$. Furthermore, when the measurement wavelength $\lambda m$ practically coincides with a wavelength $\lambda i$ within the wavelengths $\lambda 1$ to $\lambda n$, the C-OTDR measuring apparatus 36 stops the signal emission of the LD 38-i.

When the measuring and controlling of the gain profile in the optical fiber line 14 is performed, it is preferable not to return the light entered into the counter station 12 from the optical fiber line 14 toward the optical fiber line 14 again.

For that purpose, an optical terminator 42 to absorb the light input from the optical fiber line 14 is disposed in the counter station 12. In addition, it is necessary to supply a laser light (namely, a loading light) of a predetermined power or more to each of the optical amplifiers 20b in the optical fiber line 16. Accordingly, a laser 44 is also disposed in the counter station 12. The laser 44 might comprise a single laser light source or a plurality of laser light sources. The configuration of the laser 44 is determined according to conditions.

Figure 2:
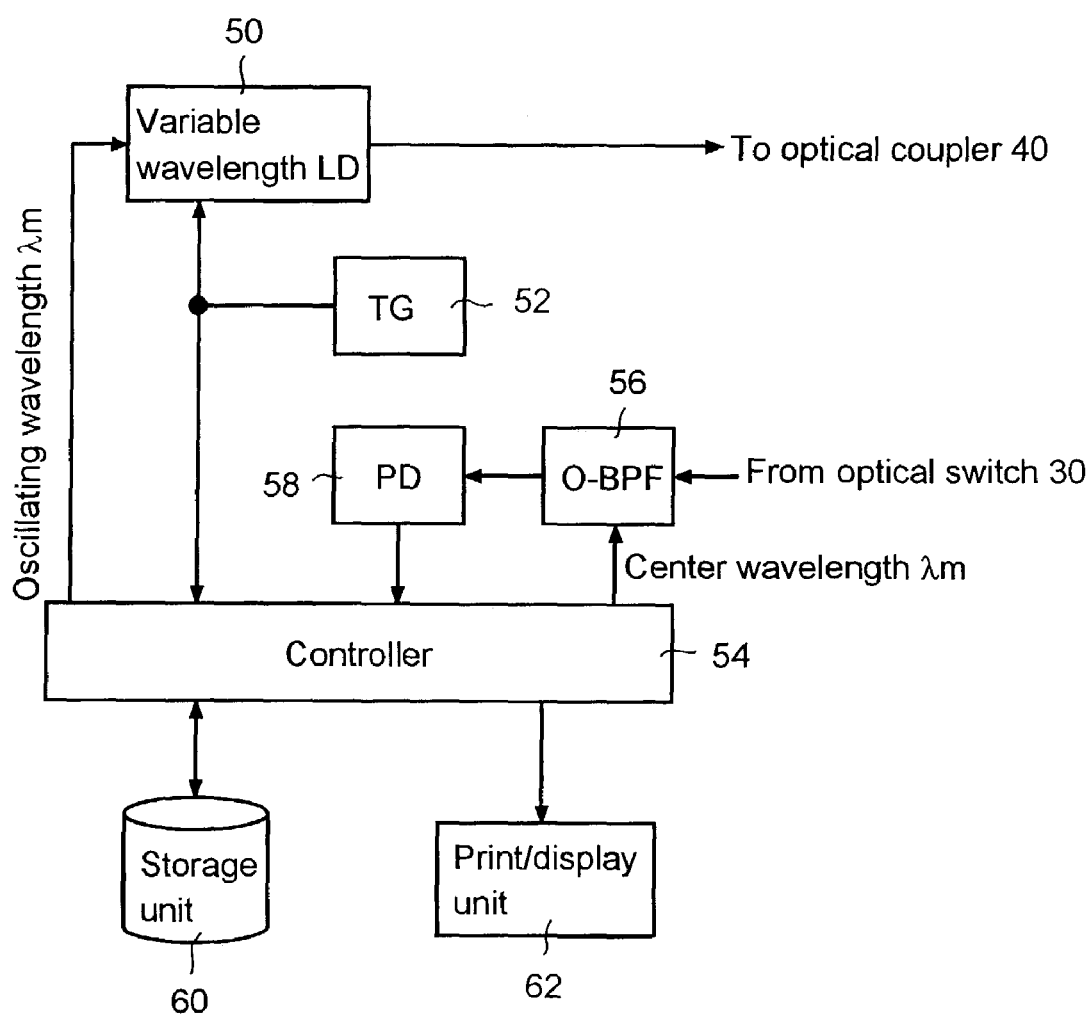
FIG. 2 shows a schematic block diagram of a C-OTDR measuring apparatus 36.

It is possible to use a well-known configuration as the C-OTDR measuring apparatus 36. FIG. 2 shows a schematic block diagram of the C-OTDR measuring apparatus 36. A variable wavelength laser diode 50 outputs a pulse laser light (a probe pulse light) to the optical coupler 40 according to a timing signal from a timing generator 52. A controller 54 comprising a microcomputer controls an oscillating wavelength λm of a variable wavelength laser diode 50. The controller 54 also controls a transmission center wavelength of an optical bandpass filter (O-BPF) 56 to keep λm interlocking with the control for the oscillating wavelength λm of the variable wavelength laser diode 50.

The O-BPF 56 extracts component of the wavelength λm out of the light input from the optical switch 30 to apply to a photodetector 58. The photodetector 58 converts the intensity of input light into the amplitude of electric signal to apply into the controller 54.

To improve the sensitivity of the C-OTDR, the output light from the laser diode 50 is sometimes amplitude-modulated or frequency-modulated. In this case, a gain profile in an optical transmission line can be measured by extracting an amplitude-modulated component or frequency-modulated component out of the output from the photodetector 58 without an O-BPF 56. By disposing the O-BPF 56, the measuring sensitivity is surely improved.

The controller 54 digitizes the analog output from the photodetector 58 to fetch and store the digitized value in a storage unit 60 as a C-OTDR data according to the passage of time which begins with the timing signal from the timing generator 52. The controller 54 reads out the data stored in the storage unit 60 and applies to a print/display unit 62 according to the direction from the operator. The print/display unit 62 prints or displays the input data according to the passage of time.

In the control station 10, the optical switch 28 selects a signal light (a terminal A) output from the transmission terminal apparatus 24 or output light (a terminal B) from the optical coupler 40 and applies the selected light to the optical fiber line 14. The optical switch 30 applies the light input from the optical fiber line 16 to the transmission terminal apparatus 24 through the terminal A or to the C-OTDR measuring apparatus 36 through the terminal B.

In the counter station 12, the optical switch 32 applies the light input from the optical fiber line 14 to the transmission terminal apparatus 26 through the terminal A or to the optical terminator 42 through the terminal B. The optical switch 34 selects the signal light (the terminal A) output from the transmission terminal apparatus 26 or the output light (the terminal B) from the laser 44 and applies the selected light to the optical fiber line 16.

The operation for measuring and controlling the gain profile in the optical fiber line 14 is explained below. In this case, the optical switches 28, 30, 32, and 34 are connected to the terminal B. The laser 44 is set in an emission state so that each of the optical amplifiers 20b in the optical fiber line 16 operates under similar condition to that in signal transmission.

The controller 54 in the C-OTDR measuring apparatus 36 firstly sets the oscillating wavelength of the variable wavelength laser diode 50 to λ1, and the laser diode 50 outputs the probe pulse light of wavelength λ1 to the optical coupler 40 according to the timing from the timing generator 52. In this case, the measurement wavelength λm is equal to λ1. The controller 54 also stops the emission of the LD 38-1 and makes the LDs 38-2 to 38-n emit.

The optical coupler 40 combines the output light from the LD 38-2 to 38-n and the output light from the C-OTDR measuring apparatus 36. The combined light enters the optical fiber line 14 through the optical switch 28 and propagates in the optical fiber transmission line 14 toward the counter station 12. At that time, a part of the probe pulse light of the measurement wavelength λm is returned to the optical fiber line 16 by the C-OTDR path 20c of each optical repeater 20 and enters the C-OTDR measuring apparatus 36 through the optical switch 30. In the C-OTDR measuring apparatus 36, the optical bandpass filter 56 extracts the components of the measurement wavelength λm, which is equal to λ1 in this stage, out of the light input from the optical fiber line 16, and the photodetector 58 converts the output light from the optical bandpass filter 56 into an electric signal. A signal indicating the intensity of the probe pulse light of the measurement wavelength λm is applied to the controller 54 and stored in the storage unit 60.

Figure 3:
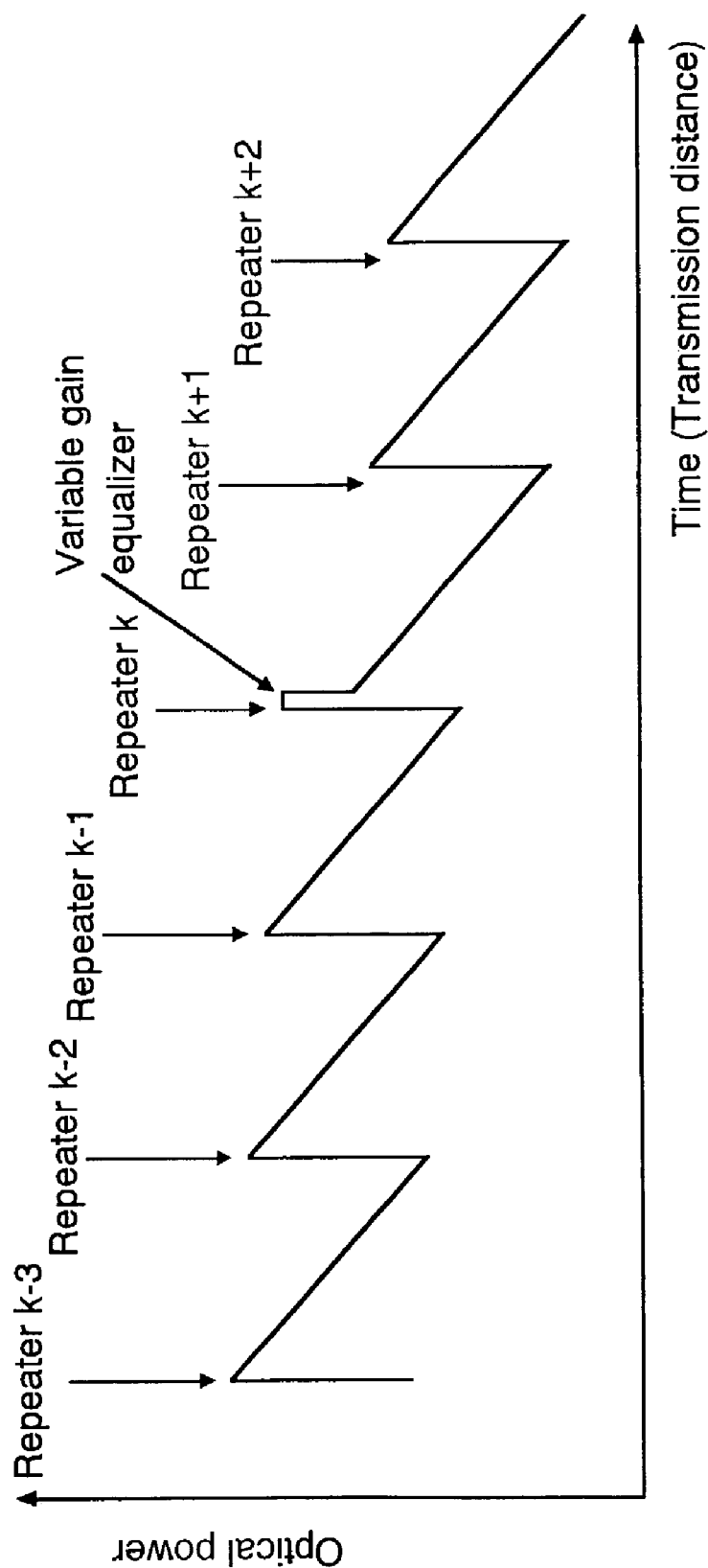
FIG. 3 shows an example of C-OTDR waveform.

FIG. 3 shows a C-OTDR waveform example of probe pulse light. It is the repetition of the amplification in the optical repeater 20 and the attenuation in the optical transmission fiber 18. On the location where the variable gain equalizer 22, there is a level variation according to the transmission characteristics of the wavelength λm of the variable gain equalizer 22. The controller 54 in the C-OTDR measuring apparatus 36 writes the optical repeater output optical power just before the variable gain equalizer 22, namely the input optical power Pin (λm) of the variable gain equalizer 22 into the storage unit 60.

When the variable gain equalizers 22 are disposed as shown in FIG. 1, the influence of the variable gain equalizer 22 in the optical fiber line 14 and the influence of the variable gain equalizer 22 in the optical fiber line 16 are shown overlapped. If the influence of the variable gain equalizer 22 in the optical fiber line 16 is omitted while the influence of the variable gain equalizer 22 in the optical fiber line 16 is controlled, the variable gain equalizer 22 in the optical fiber line 16 is set to a through-state or leaves its equalizing characteristics flat relative to the wavelengths.

Secondly, the measurement wavelength λm is set to λ2, the emission of LD 38-2 is stopped, LDs 38-1 and 38-3 to 38-n are made to emit to perform C-OTDR measurement for the wavelength λ2, and the input optical power of the variable gain equalizer 22 is stored in the storage unit 60. After this, the C-OTDR measurement is performed until the wavelength λn in the same way.

Figure 4:
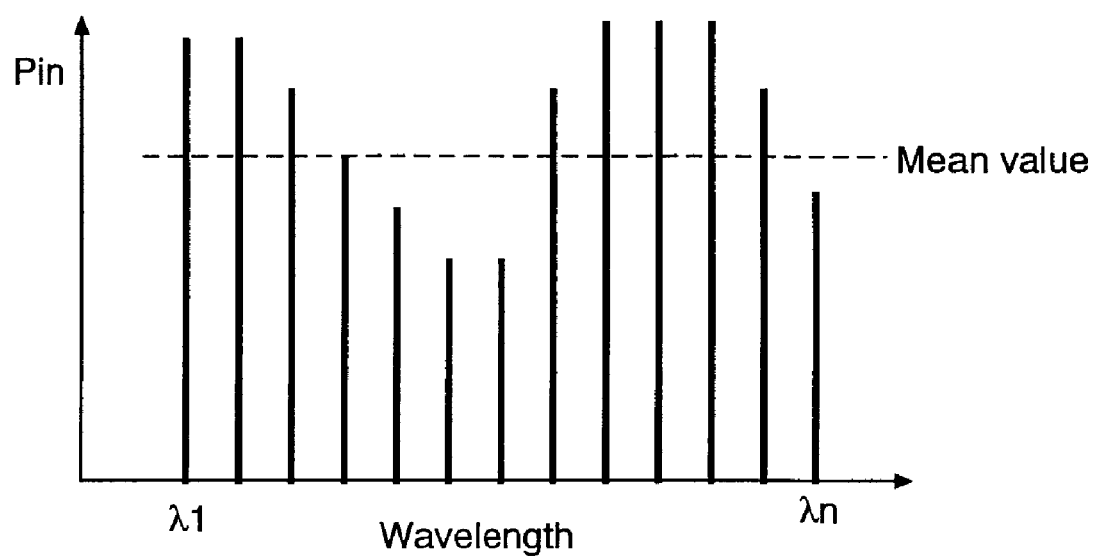
FIG. 4 shows an example of measured gain profile.

With the above operation, the input optical power Pin (λ1) to Pin (λn) of the variable gain equalizer 22 can be measured relative to each of the signal wavelength λ1 to λn. FIG. 4 shows the measured results. The equalizing characteristics of the variable gain equalizer 22 are remotely controlled from the control station 10 so that the obtained gain profile becomes flat because of the operation of the variable gain equalizer 22. When optical devices in the optical fiber lines 14 and 16 are controlled or adjusted, generally, a method for superimposing remote-control signals by amplitude-modulating a signal light of a specific wavelength or WDM signal light is used. Therefore, the optical switch 28 is switched to the terminal A so that a control signal for remotely controlling the equalizing characteristics of the variable gain equalizer 22 is sent to the variable gain equalizer 22 from the transmission terminal apparatus 24.

Although the operation for controlling the gain profile of the variable gain equalizer 22 according to the data of input optical power distribution of the variable gain equalizer 22 relative to each signal wavelength, it is obvious that the gain profile of the variable gain equalizer 22 can be controlled to be flatten according to a data of an output optical power distribution of the variable gain equalizer 22 relative to each signal wavelength or a data of an optical power distribution in the back part.

Figure 5:
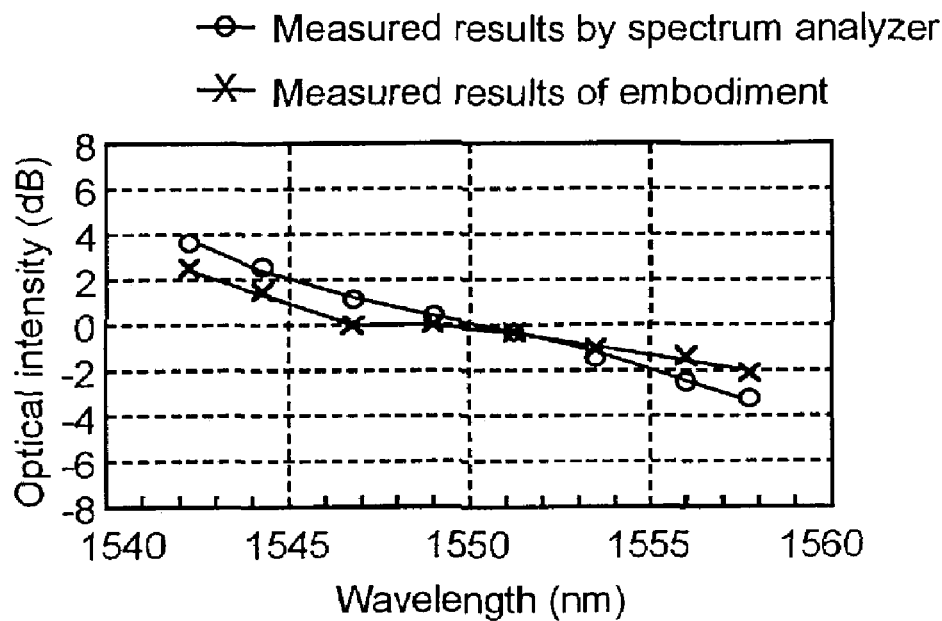
FIG. 5 shows a comparative example between a measured result by a spectrum analyzer and a measured result by the embodiment.
Figure 6:
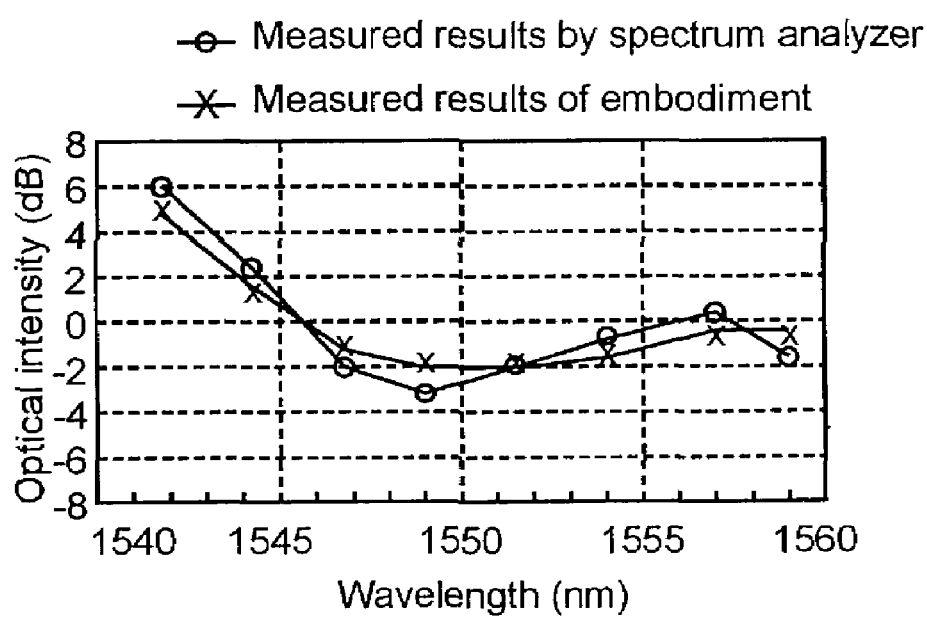
FIG. 6 shows another comparative example between a measured result by a spectrum analyzer and a measured result by the embodiment.

In a 660-km bidirectional optical transmission lines composed of a pair of optical fibers, a gain profile result measured through a C-OTDR is compared with a result practically measured by a spectrum analyzer. FIG. 5 shows a measured result of a downward profile to the right, and FIG. 6 shows a measured result of V-shaped profile. In both drawings, the horizontal axis shows a wavelength, and the vertical axis shows optical intensity (dB). In both cases, the measured results are in error by less than 1.5 dB, namely practically in an acceptable range.

Figure 7:
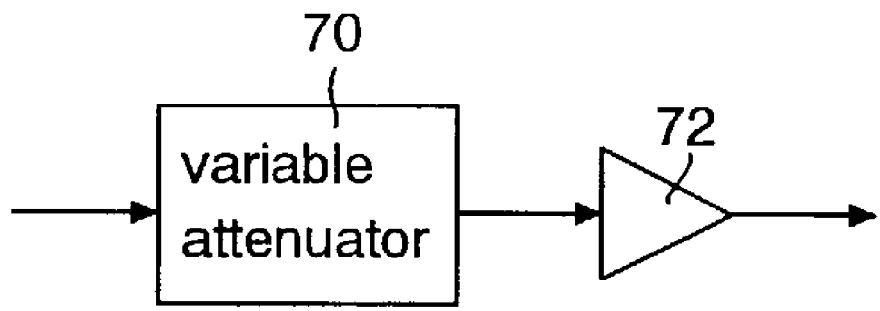
FIG. 7 shows a schematic diagram of a variable gain equalizer 22.

FIG. 7 shows a configuration example of the variable gain equalizer 22. The variable gain equalizer 22 shown in FIG. 7 has a configuration in which a variable attenuator 70 and an optical amplifier 72 are connected in serial. The details about this configuration is described in N. Takeda et al, "Active gain equalization for transoceanic WDM transmission systems", OFC99, WM43-1.

Figure 8:
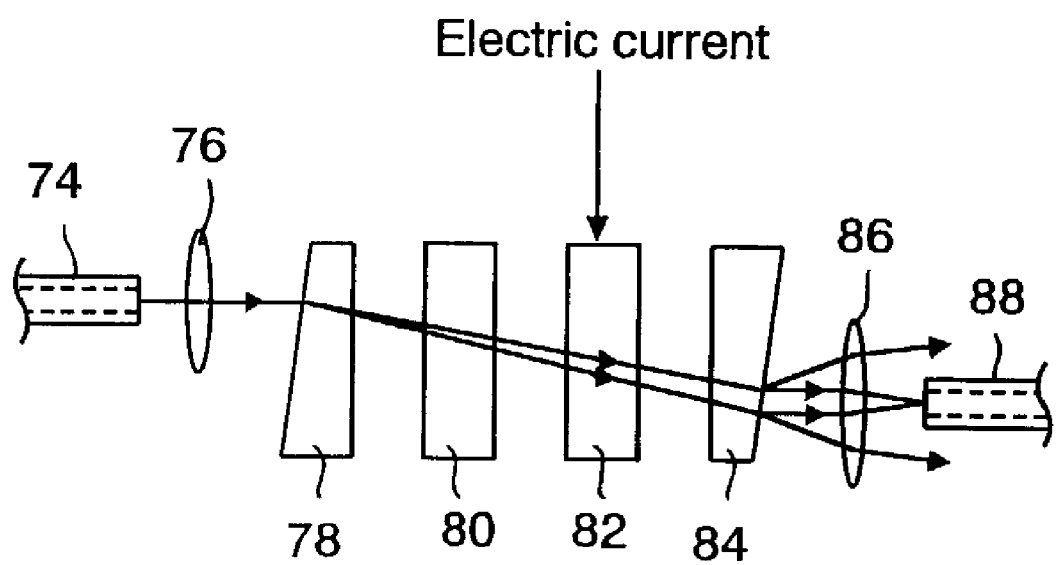
FIG. 8 shows another schematic diagram of a variable gain equalizer 22.

FIG. 8 shows another configuration of the variable gain equalizer 22. In the configuration shown in FIG. 8, a Faraday rotator is used. An output light from an input optical fiber 74 is turned to a parallel beam by a collimator lens 76 to enter a Faraday rotator 82 through a wedge prism 78 and birefringent plate 80. The birefringent plate 80 splits an input light into two orthogonal polarization components. The Faraday rotator 82 rotates the polarizations of input lights according to an applied voltage. The output light from the Faraday rotator 82 enters an output light fiber 88 through a wedge prism 84 and a condensing lens 86. The gain equalizing characteristics can be controlled by the wavelength dependency of elements 78 to 84. For instance, it is possible to give a short wave downward or long wave downward gain slope of maximum amount of 10 dB in a wavelength band of 1535 to 1565 nm. The details of this configuration is described in T. Naito et al., "Active Gain Slope Compensation in Large-Capacity, Long-Haul WDM Transmission System", OAA99, WC5.

Figure 9:
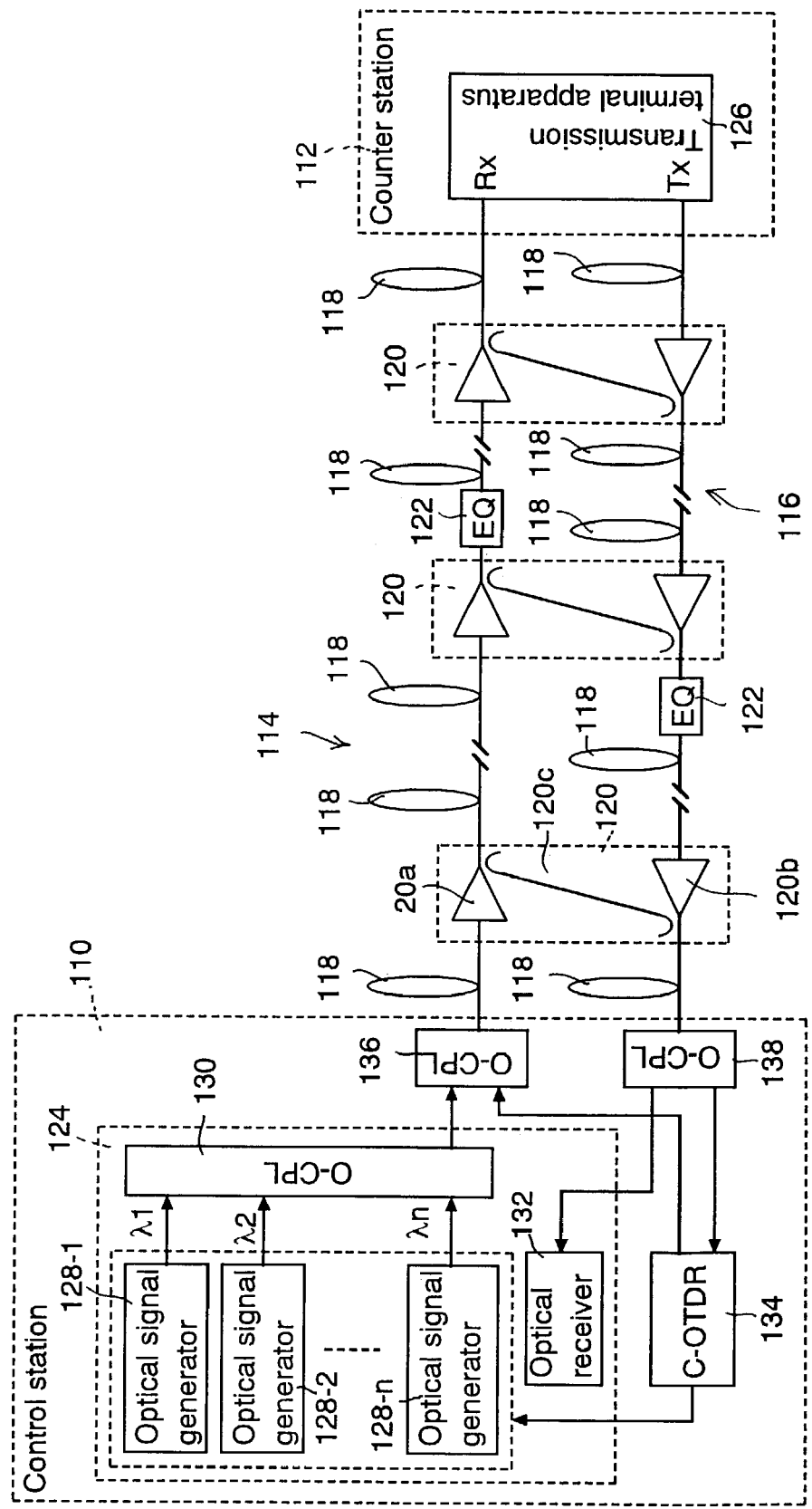
FIG. 9 shows a schematic block diagram of a second embodiment according to the invention.

FIG. 9 shows a schematic block diagram of an embodiment in which a gain profile in an optical fiber line can be measured and adjusted in-service.

Two optical fiber lines 114 and 116 connect between a control station 110 and a counter station 112. Each of the optical fiber lines 114 and 116 comprises a plurality of optical transmission fibers 118 and an optical repeater 120 to optically amplify an optical signal propagating in the optical transmission fiber 118. Each of the optical fiber lines 114 and 116 comprises at least one variable gain equalizer 122 disposed on an appropriate part in the line. The configuration of the optical fiber lines 114 and 116 is identical to that of the optical fiber lines 14 and 16. The optical repeater 120 comprises, similarly to the optical repeater 20, an optical amplifier 120a in the optical fiber line 114, an optical amplifier 120b in the optical fiber line 116, and a C-OTDR optical path 120c or an optical loop back circuit for looping back a light between the optical fiber lines 114 and 116.

In FIG. 9, only the configuration for measuring and controlling a gain profile in the optical fiber line 114 is illustrated. However, it is obvious that a gain profile in the optical fiber line 116 can be measured by replacing the configuration of the control station 110 and the configuration of the counter station 120 and the gain profile in the optical fiber line 116 can be controlled by the variable gain equalizer 122 in the optical fiber line 116.

For the transmission of optical signals through the optical fiber lines 114 and 116, the control station 110 comprises a transmission terminal apparatus 124 and the counter station 112 comprises a transmission terminal apparatus 126. Similarly to the first embodiment, a WDM transmission system of n wavelengths ($\lambda 1$ to $\lambda n$) is used for the signal transmission between the transmission terminal apparatuses 124 and 126, and thus the optical fiber lines 114 and 116 are designed accordingly.

The transmission terminal apparatus 124 comprises optical signal generators 128-1 to 128-n for respectively generating optical signals of different wavelengths $\lambda 1$ to $\lambda n$, an optical coupler 130 for coupling output light from the optical signal generators 128-1 to 128-n, and an optical receiver 132 for receiving a WDM signal light input from the optical fiber 116.

The configuration and operation of the C-OTDR measuring apparatus 134 is basically identical to those of the C-OTDR measuring apparatus 36 in the first embodiment. That is, The C-OTDR measuring apparatus 134 outputs a probe pulse light of wavelength $\lambda m$ for the optical coupler 136 and measures intensity of a return light of the probe pulse light entering from the optical fiber 116 through the optical coupler 138 in the time domain.

The optical coupler 136 combines the output light from the optical coupler 130 with the probe pulse light from the c-OTDR measuring apparatus 134 and outputs the combined light for the optical fiber line 114. The optical coupler 138 also splits the light from the optical fiber line 116 into two portions and applies one portion to the optical receiver 132 and the other to the C-OTDR measuring apparatus 134. The transmission terminal apparatus 124 and the C-OTDR measuring apparatus 134 can always and simultaneously connect to the optical fiber lines 114 and 116 by the optical couplers 136 and 138. This configuration, as described later, makes it possible to perform measuring and controlling of gain profiles in-service.

Figure 10:
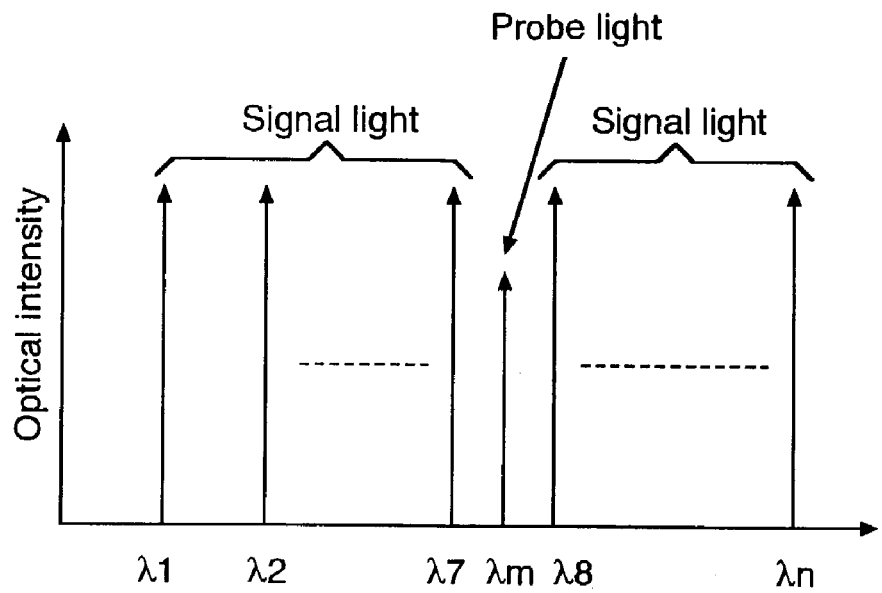
FIG. 10 shows a position of probe light in the second embodiment.
Figure 11:
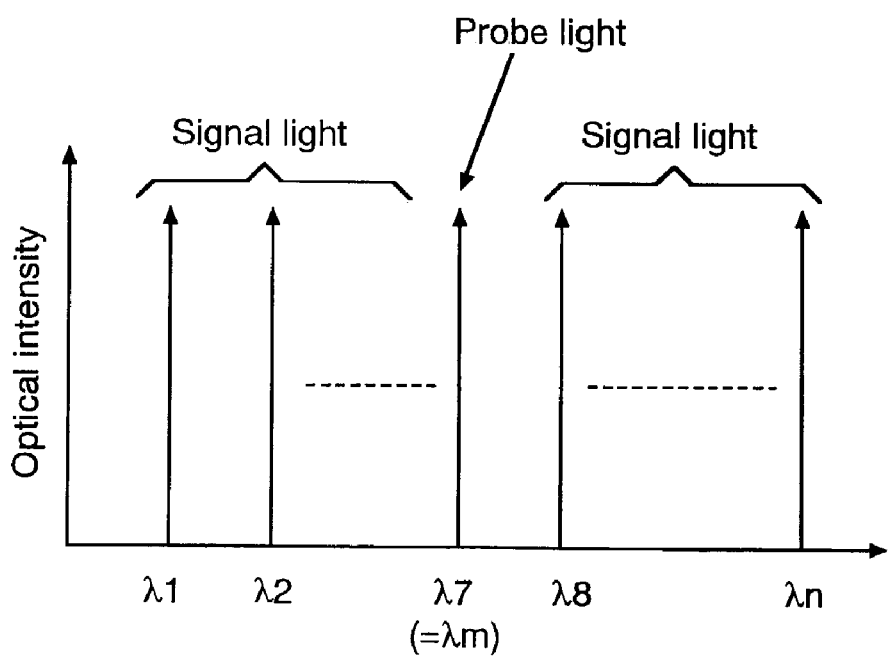
FIG. 11 shows another position of probe light in the second embodiment.

Although the measurement wavelength $\lambda m$ should be one of the signal wavelengths $\lambda 1$ to $\lambda n$ in the C-OTDR measuring apparatus 36, the measurement wavelength $\lambda m$ can be any wavelength locating between the signal wavelengths $\lambda 1$ and $\lambda n$ in the C-OTDR measuring apparatus 134. FIG. 10 shows a wavelength position example when the measurement wavelength $\lambda m$ is located in the center between signal wavelengths $\lambda 7$ and $\lambda 8$. FIG. 11 shows a wavelength position example when the measurement wavelength $\lambda m$ practically coincides with the signal wavelength $\lambda 7$. In both FIGS. 10 and 11, the horizontal axis shows a wavelength and the vertical axis shows optical intensity.

As shown in FIG. 10, when the measurement wavelength $\lambda m$ is set to a wavelength in the center of two adjacent signal wavelengths, it is possible to continue data transmission services of signal wavelengths on both sides of the measurement wavelength $\lambda m$. That is, the measuring and controlling of gain profiles can be performed in-service. In this case, as shown in FIG. 10, it is preferable to lower the optical intensity of the probe light compared to the optical intensity of the signal light. If the optical intensity of the probe light is too high, it influences the transmission characteristics of the signal light and thus makes it difficult to accurately measure the gain profile.

The C-OTDR measuring apparatus 134 controls a corresponding one of the signal light generators 128-1 to 128-n to stop its signal light emission when the measurement wavelength λm coincides with any one of the signal wavelengths λ1 to λn or the C-OTDR measurement is hindered. In this case, the service of the channel being stopped its signal emission is suspended.

The C-OTDR measuring apparatus 134 discretely sweeps the measurement wavelength λm within a range of wavelengths λ1 to λn to measure input or output optical power of the variable gain equalizer 122 in the optical fiber line 114 for each wavelength. According to the measured result of each wavelength, the equalizing characteristics of the variable gain equalizer 122 in the optical fiber line 114 is controlled so that the gain profile in the optical fiber line 114 becomes flat.

Although the embodiment in which a single variable gain equalizer is disposed in an optical fiber line was explained, it is obvious that the invention is also applicable to an embodiment in which a plurality of variable gain equalizers are disposed. In this case, a plurality of variable gain equalizer is sequentially controlled.

Although the embodiment using the C-OTDR was explained, a similar effect is obtained when the OTDR is used.

As readily understandable from the aforementioned explanation, according to the invention, a gain profile in an optical fiber line can be measured using a conventional OTDR method. The gain profile in the optical fiber line can be adjusted to a desirable profile by remotely controlling equalizing characteristics of a variable gain equalizer in the optical fiber line according to the measured result.

While the invention has been described with reference to the specific embodiment, it will be apparent to those skilled in the art that various changes and modifications can be made to the specific embodiment without departing from the spirit and scope of the invention as defined in the claims.

What is claimed is:

1. In an optical transmission system having first and second optical fiber lines, each of the first and second optical fiber lines transmitting a signal light in the opposite direction from the other, and a Coherent Optical Time Domain Reflectometry (C-OTDR) optical loop back circuit for optically connecting between the first and second optical fiber lines, a method for measuring a gain profile in the first optical fiber line, the method comprising:
   supplying the first optical fiber line with a plurality of laser lights, each of the plurality of laser lights having a different wavelength, and a probe pulse light having a measurement wavelength, the measurement wavelength being different from the wavelengths of the plurality of laser lights;
   measuring a power level of the probe pulse light at a predetermined position in the first optical fiber line from a return light of the probe pulse light entered through the C-OTDR optical loop back circuit and the second optical fiber line using C-OTDR; and
   performing the supplying and measuring steps while varying the measurement wavelength within a predetermined wavelength range.

2. The method of claim 1 wherein the first optical fiber line comprises a variable gain equalizer, and the predetermined position is on an input side of the variable gain equalizer.

3. The method of claim 1 wherein the first optical fiber line comprises a variable gain equalizer, and the predetermined position is on an output side of the variable gain equalizer.

4. The method of claim 1 wherein the plurality of laser lights, each having a different wavelength, comprise optical carriers to carry a signal.

5. The method of claim 1, further comprising remotely controlling a variable gain equalizer for forming a gain profile in a desired shape.

6. In an optical transmission system having first and second optical fiber lines, each of the first and second optical fiber lines transmitting a signal light in the opposite direction from the other, and a Coherent Optical Time Domain Reflectometry (C-OTDR) optical loop back circuit for optically connecting between the first and second optical fiber lines, a system for measuring a gain profile in the first optical fiber line comprising:
   laser light generators to generate a plurality of laser lights, each of the plurality of laser lights having a different wavelength;
   a probe pulse light generator to generate a probe pulse light having a measurement wavelength, the measurement wavelength being variable within a predetermined wavelength range;
   an optical coupler to combine the plurality of laser lights output from the laser light generators and the probe pulse light and to output a combined light to the first optical fiber line;
   a measuring apparatus to measure a power level of the probe pulse light at a predetermined position in the first optical fiber line from a return light of the probe pulse light entered through the C-OTDR loop back circuit and the second optical fiber line using C-OTDR; and
   a controller to control the measuring apparatus so as to perform measurement within the predetermined wavelength range while varying the measurement wavelength within the predetermined wavelength range.

7. The system of claim 6 wherein the first optical fiber line comprises a variable gain equalizer, and the predetermined position is on an input side of the variable gain equalizer.

8. The system of claim 6 wherein the first optical fiber line comprises a variable gain equalizer, and the predetermined position is on an output side of the variable gain equalizer.

9. The system of claim 6 wherein the laser light generators comprise signal light generators for outputting a plurality of signal lights, each having a different wavelength.

10. The system of claim 9 wherein the controller controls the signal light generators to stop the emission of the signal light having a wavelength approximately equal to the measurement wavelength.

11. The system of claim 6, further comprising a remotely controlled variable gain equalizer for forming a gain profile in a desired shape.

12. In an optical transmission system having first and second optical fiber lines, each of the first and second optical fiber lines transmitting a signal light in the opposite direction from the other, and a Coherent Optical Time Domain Reflectometry (C-OTDR) optical loop back circuit for optically connecting between the first and second optical fiber lines, a method for controlling a gain profile in the first optical fiber line, the method comprising:
   supplying the first optical fiber line with a plurality of laser lights, each of the plurality of laser lights having a different wavelength, and a probe pulse light having a measurement wavelength, the measurement wavelength being different from the wavelengths of the plurality of laser lights;

measuring a power level of the probe pulse light at a predetermined position in the first optical fiber line from a return light of the probe pulse light entered through the C-OTDR optical loop back circuit and the second optical fiber using C-OTDR;

storing the measured result of the measuring step within a predetermined wavelength range after operating the probe pulse supplying step and measuring step while varying the measurement wavelength within the predetermined wavelength range; and controlling equalizing characteristics of a variable gain equalizer disposed in the first optical fiber line according to the stored measured result.

13. The method of claim 12 wherein the predetermined position is on an input side of the variable gain equalizer.

14. The method of claim 12 wherein the predetermined position is on an output side of the variable gain equalizer.

15. The method of claim 12 wherein the plurality of laser lights, each having a different wavelength, comprise optical carriers to carry a signal.

16. In an optical transmission system having first and second optical fiber lines, each of the first and second optical fiber lines transmitting a signal light in the opposite direction from the other, and a Coherent Optical Time Domain Reflectometry (C-OTDR) optical loop back circuit for optically connecting between the first and second optical fiber lines, a system for controlling a gain profile in the first optical fiber transmission line comprising:

a variable gain equalizer disposed in the first optical fiber line;

laser light generators to generate a plurality of laser lights, each of the plurality of laser lights having a different wavelength;

a probe pulse light generator to generate a probe pulse light, the probe pulse light having a measurement wavelength variable within a predetermined wavelength range;

an optical coupler to combine the laser lights output from the plurality of laser light generators and the probe pulse light to output a combined light into the first optical fiber line;

a measuring apparatus to measure a power level of the probe pulse light at a predetermined position in the first optical fiber line from a return light of the probe pulse light entered through the C-OTDR optical loop back circuit and the second optical fiber line using C-OTDR; and a controller to control the measuring apparatus so as to perform measurement within the predetermined wavelength range while varying the measurement wavelength within the predetermined wavelength range and to control the variable gain equalizer according to power levels of the plurality of measurement wavelengths measured on the predetermined position.

17. The system of claim 16 wherein the predetermined position is on an input side of the variable gain equalizer.

18. The system of claim 16 wherein the predetermined position is on an output side of the variable gain equalizer.

19. The system of claim 16 wherein the laser light generators comprise signal light generators to output a plurality of signal lights, each of the plurality of signal lights having a different wavelength.

20. The system of claim 16 wherein the controller controls the signal light generators to stop emission of signal light having a wavelength approximately equal to the measurement wavelength.

21. A method for measuring a gain profile in an optical transmission system, the method comprising:

supplying a first optical fiber line with a plurality of laser lights, each of the plurality of laser lights having a different wavelength, and a probe light having a measurement wavelength, the measurement wavelength being different from the wavelengths of the plurality of laser lights;

varying the measurement wavelength within a predetermined range; and measuring a power level of the probe pulse light at a predetermined position in the first optical fiber line from a return light of the probe pulse light passed through a Coherent Optical Time Domain Reflectometry (C-OTDR) optical loop back circuit and a second optical fiber line using C-OTDR.

22. The method of claim 21 wherein the first optical fiber line comprises a variable gain equalizer, and the predetermined position is on an input side of the variable gain equalizer.

23. The method of claim 21 wherein the first optical fiber line comprises a variable gain equalizer, and the predetermined position is on an output side of the variable gain equalizer.

24. The method of claim 21 wherein the plurality of laser lights, each having a different wavelength, comprise optical carriers to carry a signal.

25. The method of claim 21, further comprising remotely controlling a variable gain equalizer for forming a gain profile in a desired shape.

* * * * *